US010613633B2

(12) United States Patent
Kim et al.

(10) Patent No.: US 10,613,633 B2
(45) Date of Patent: Apr. 7, 2020

(54) TACTILE FEEDBACK DEVICE

(71) Applicant: RESEARCH & BUSINESS FOUNDATION SUNGKYUNKWAN UNIVERSITY, Suwon-si, Gyeonggi-do (KR)

(72) Inventors: Sang Woo Kim, Yongin-si (KR); Wan Chul Seung, Yongin-si (KR); Hong Joon Yoon, Goyang-si (KR); Sung Soo Kwak, Suwon-si (KR); Dong Hoon Kim, Daejeon (KR); Tae Yun Kim, Incheon (KR); Min Ki Kang, Suwon-si (KR); Kang Hyuck Lee, Suwon-si (KR); Sung Kyun Kim, Suwon-si (KR); Jeong Hwan Lee, Gumi-si (KR); Seong Su Kim, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 106 days.

(21) Appl. No.: 15/788,902

(22) Filed: Oct. 20, 2017

(65) Prior Publication Data

US 2018/0129286 A1    May 10, 2018

(30) Foreign Application Priority Data

Nov. 8, 2016    (KR) .................. 10-2016-0147978

(51) Int. Cl.
*H01L 29/84*      (2006.01)
*G06F 3/01*        (2006.01)
*G09B 21/00*      (2006.01)

(52) U.S. Cl.
CPC .............. *G06F 3/016* (2013.01); *G06F 3/011* (2013.01); *G09B 21/004* (2013.01)

(58) Field of Classification Search
CPC ........ G06F 3/016; G06F 3/011; G09B 21/004
See application file for complete search history.

(56) References Cited

U.S. PATENT DOCUMENTS

| 5,543,589 A * | 8/1996 | Buchana ............... G06F 3/0414 178/18.03 |
| 9,984,269 B1 * | 5/2018 | Roizin ............... G06K 9/00013 |
| 10,019,085 B2 * | 7/2018 | Qiao ...................... G06F 3/041 |

(Continued)

FOREIGN PATENT DOCUMENTS

| KR | 100773061 B1 | 11/2007 |
| KR | 20150121399 A | 10/2015 |

*Primary Examiner* — Ismail A Muse
(74) *Attorney, Agent, or Firm* — NSIP Law

(57) ABSTRACT

There is provided a tactile feedback device comprising: an array of surface charge generation units; and an array of pressure-generation units, wherein the array of the pressure-generation units is spaced apart from the array of the surface charge generation units, wherein the array of the pressure-generation units is movable relative to the array of the surface charge generation units, wherein an attractive or repulsive force is generated between a corresponding surface charge generation unit of the array of surface charge generation units and a corresponding pressure-generation unit of the array of the pressure-generation units, based on a polarity of surface charges induced in the corresponding surface charge generation unit.

15 Claims, 5 Drawing Sheets

(56) References Cited

U.S. PATENT DOCUMENTS

| | | | | |
|---|---|---|---|---|
| 2004/0155991 | A1* | 8/2004 | Lowles | G02F 1/13306 |
| | | | | 349/12 |
| 2008/0030479 | A1* | 2/2008 | Lowles | G02F 1/13306 |
| | | | | 345/173 |
| 2010/0020039 | A1* | 1/2010 | Ricks | G02F 1/13338 |
| | | | | 345/173 |
| 2013/0272557 | A1* | 10/2013 | Ozcan | G06F 1/1637 |
| | | | | 381/333 |
| 2014/0029077 | A1* | 1/2014 | Mao | G02B 26/02 |
| | | | | 359/230 |
| 2014/0094003 | A1* | 4/2014 | Daniel | H01L 29/78684 |
| | | | | 438/151 |
| 2014/0124755 | A1* | 5/2014 | Lee | H01L 51/0516 |
| | | | | 257/40 |
| 2014/0300251 | A1* | 10/2014 | Colli | H01L 41/25 |
| | | | | 310/339 |
| 2016/0133713 | A1* | 5/2016 | Gutman | H01L 29/42324 |
| | | | | 257/66 |
| 2017/0338253 | A1* | 11/2017 | Sato | H01L 27/1255 |
| 2018/0203559 | A1* | 7/2018 | Choi | G06F 3/165 |
| 2018/0217371 | A1* | 8/2018 | Liu | G02B 26/023 |
| 2018/0246622 | A1* | 8/2018 | Lee | G06F 3/0482 |
| 2019/0067384 | A1* | 2/2019 | Zou | H01L 27/3227 |

* cited by examiner

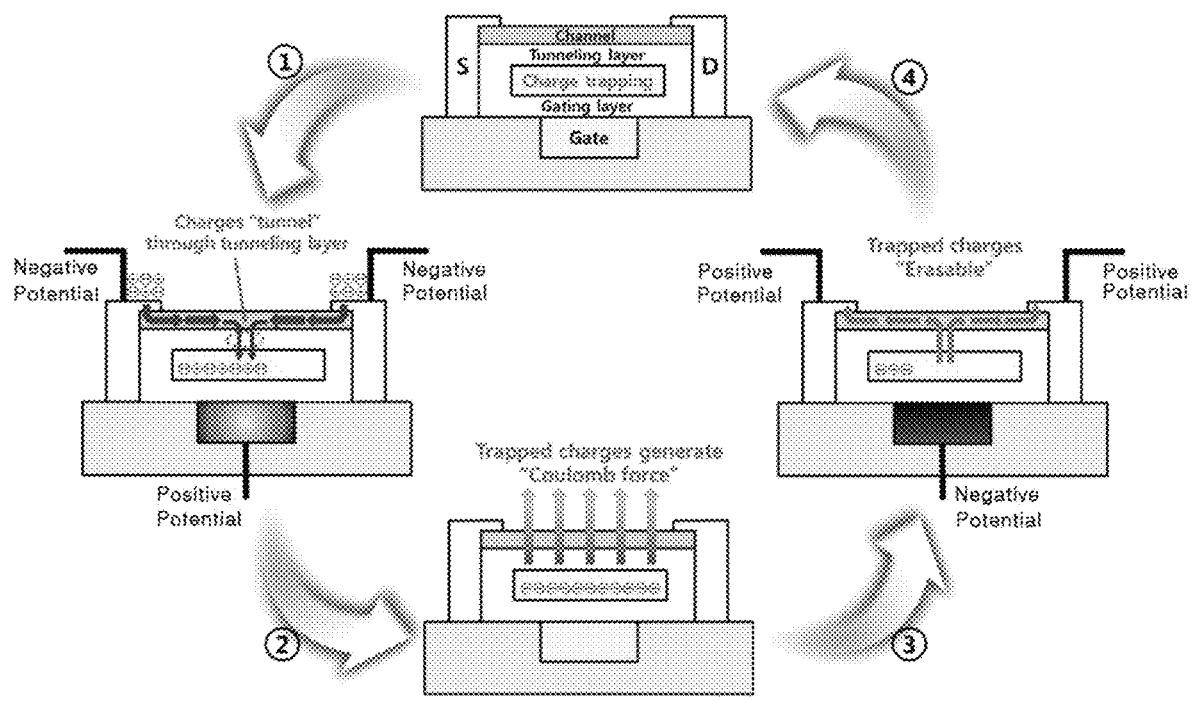

TACTILE FEEDBACK DEVICE

CROSS-REFERENCE TO RELATED APPLICATION

This application claims the benefit of Korean patent application No. 10-2016-0147978 filed on Nov. 8, 2016, the entire content of which is incorporated herein by reference for all purposes as if fully set forth herein.

BACKGROUND

Field of the Present Disclosure

The present disclosure relates to a tactile feedback device for use in a virtual reality device and an augmented reality device for realizing imitation reality.

Discussion of Related Art

When precise tactile feedback technology is added to VR (Virtual Reality) or AR (Augmented Reality) technology, which allows more intuitive feedback of information about real objects or virtual objects, it is possible to implement imitation reality which is more realistic than the virtual reality.

The current information acquisition approach is evolving from an approach of acquiring audiovisual information (text, picture, video, etc.) via PC, smart phone, etc. to VR and AR approach of acquiring information via intuitive experience.

When other sensory information (tactile, taste, smell information) together with visual and audio information about a virtual object are employed, it is possible to realize the imitation reality that is one dimensional evolved from the virtual reality and thus is more realistic than the virtual reality. This imitation reality is expected to present a new paradigm for the overall life areas, at the evolution from conventional mobile phones to smart phones has done.

Among the five senses of the human body, visual, auditory, taste and smell information are non-interactive passive information. However, tactile information may be actively exchanged via interaction with virtual reality, enabling intuitive and efficient information acquisition. Therefore, development of a tactile feedback device should be the first priority for implementing the imitation reality.

Conventional tactile feedback devices are mainly based on electrical and mechanical stimulation. In the case of electrical stimulation, it is difficult to deliver accurate tactile information due to a large difference from actual tactile information. In the case of mechanical stimulation, practical application is difficult due to the complexity of components of the mechanical tactile device, large volume, high driving power, and the like, thereof.

For implementation of the tactile feedback device using the mechanical stimulation, precise actuator technology is required. However, existing actuators have a number of technical limitations.

Conventionally, various kinds of devices are used as conventional actuators. Disadvantages of such actuator devices may include followings: eccentric motor—long response time, linear resonance—weak durability, piezoelectricity—high power consumption requirement, electroactive polymer—high electrical potential difference requirement, and electrostatic force—local tactile feedback being disabled. Due to the limitations of these devices, the current tactile feedback technology is still lacking in terms of completeness.

SUMMARY OF THE INVENTION

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

The present disclosure is to provide a construction of imitation reality using a tactile feedback device which is added to a conventional virtual reality device or augmented reality device. To this end, the present disclosure is to provide a tip-array type tactile feedback device using electrostatic force to construct an imitation reality that provides a multidimensional sense in which tactile feedback may be added to the virtual reality, which was previously limited to the visual information.

In one aspect of the present disclosure, there is provided a tactile feedback device comprising: an array of surface charge generation units; and an array of pressure-generation units, wherein the array of the pressure-generation units is spaced apart from the array of the surface charge generation units, wherein the array of the pressure-generation units is movable relative to the array of the surface charge generation units, wherein an attractive or repulsive force is generated between a corresponding surface charge generation unit of the array of surface charge generation units and a corresponding pressure-generation unit of the array of the pressure-generation units, based on a polarity of surface charges induced in the corresponding surface charge generation unit, wherein the attractive force allows spacing between the corresponding surface charge generation unit and the pressure-generation unit to be decreased while the repulsive force allows spacing between the corresponding surface charge generation unit and the pressure-generation unit to be increased.

In one implementation, a combination of the corresponding surface charge generation unit and the pressure-generation unit defines a corresponding pixel of the device.

In one implementation, the surface charge generation unit in each pixel includes: a substrate; a gate electrode disposed on a portion of the substrate; an oxide layer covering the gate electrode to insulate the gate electrode; a first charge trapping layer disposed within the oxide layer; a channel layer disposed on the oxide layer; and a source electrode and a drain electrode respectively disposed at both longitudinal ends of the channel layer.

In one implementation, the oxide layer is defined into a tunneling oxide layer and a gate oxide layer.

In one implementation, the tunneling oxide layer is disposed between the channel layer and the first charge trapping layer, wherein the gate oxide layer is disposed between the gate electrode and the first charge trapping layer.

In one implementation, the channel layer is made of a two-dimensional material.

In one implementation, the two-dimensional material includes a material having a low carrier concentration and minimizing electric field shielding.

In one implementation, the material having a low carrier concentration and minimizing electric field shielding includes at least one of $MoS_2$, $WSe_2$, $MoTe_2$, and $WS_2$.

In one implementation, the pressure-generation unit comprises: a second charge trapping layer, and a pressure-transfer protrusion disposed on the second charge trapping layer.

In one implementation, the second charge trapping layer include an electret.

In one implementation, the second charge trapping layer is made of a material capable of receiving high-density charges and capable of semi-permanently retaining the received charges therein.

In one implementation, the material capable of receiving high-density charges and capable of semi-permanently retaining the received charges therein includes at least one of CYTOP, TEFLON AF, and Parylene.

In one implementation, the first charge trapping layer is made of a material capable of receiving high-density charges and capable of controlling surface charges.

In one implementation, the material capable of receiving high-density charges and capable of controlling surface charges includes at least one of CYTOP, TEFLON AF, and Parylene.

In one implementation, the pressure-transfer protrusion includes a lightweight material having excellent compatibility with human skin.

In one implementation, the lightweight material having excellent compatibility with human skin includes at least one of P(VDF-TrFE), PFA, TEFLON, KAPTON, and PDMS.

In one implementation, the pressure-transfer protrusion is supported by a pressure-transfer protrusion support, wherein the pressure-transfer protrusion movably passes through the support, wherein an upper portion of the pressure-transfer protrusion is held by the support, and a lower portion of the pressure-transfer protrusion is disposed under the support and is coupled to the second charge trapping layer.

According to the present disclosure, the development of the tactile feedback device using electrostatic force is expected to overcome the structural and performance limitations of the tactile feedback device that has been studied and developed in the past.

By optimizing the array of the pressure-generation units and the array of the surface charge generation units, which are components of the tactile feedback device according to the present disclosure, the tactile feedback device will be available for legacy virtual/augmented reality. It is expected that this additional feedback device will allow one-dimensional evolutionary feedback device as the tactile information is added thereto, in addition to the visual information already provided.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 5 shows the operation of the surface charge generation unit according to one embodiment of the present disclosure in order.

Figure 1:
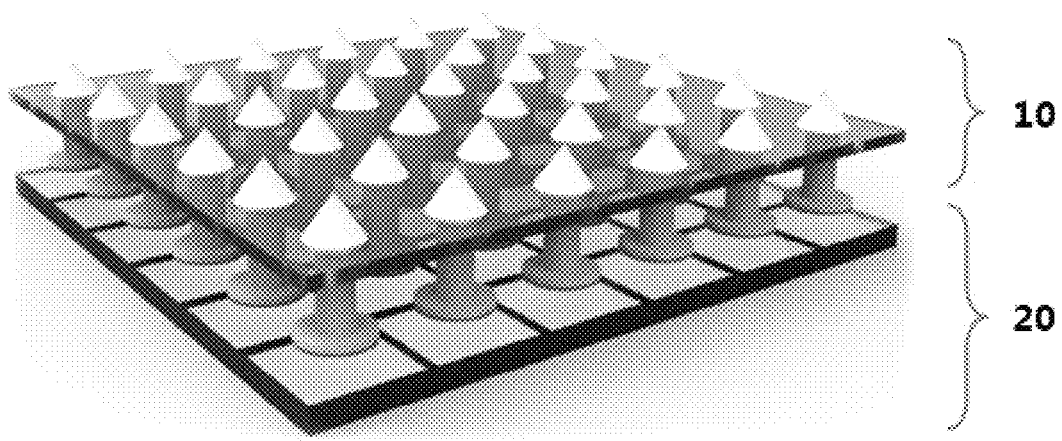
FIG. 1 shows a tactile feedback device according to one embodiment of the present disclosure.

For simplicity and clarity of illustration, elements in the figures are not necessarily drawn to scale. The same reference numbers in different figures denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

DETAILED DESCRIPTIONS OF THE INVENTION

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

Spatially relative terms, such as "beneath," "below," "lower," "under," "above," "upper," and the like, may be used herein for ease of explanation to describe one element or feature's relationship to another element s or feature s as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented for example, rotated 90 degrees or at other orientations, and the spatially relative descriptors used herein should be interpreted accordingly.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

FIG. 1 shows a tactile feedback device according to one embodiment of the present disclosure. As shown in FIG. 1, the tactile feedback device according to one embodiment of the present disclosure may include an array 20 of surface charge generation units; and an array 10 of pressure-generation units disposed on the array 20 of the surface charge generation units and spaced apart from the array 20 of the surface charge generation units. In a tactile feedback device according to one embodiment of the present disclosure, depending on the polarity of the surface charge induced in each surface charge generation unit of the array 20 of the surface charge generation units 20, each pressure-generation unit of the array 10 of the pressure-generation units is subjected to repulsive or attractive force to move the corresponding pressure-generation unit. This movement of the pressure-generation unit may lead to tactile information by the pressure-generation unit touching the skin.

The minimum charge for delivering a stimulus to the human body is as follows: When inducing a surface charge of 100 $\mu C/m^2$ or more in a charge generation layer by the Coulomb force formula, a displacement of 1.5 mm or more is realized and, thus, sufficient pressure transmission to the skin is enabled for the skin to feel. Surface charge induction techniques may employ corona poling (200-3700 $\mu C/m^2$, electron beam (600-7500 $\mu C/m^2$), soft X-ray (300-4000 $\mu C/m_2$) and electric field (17600 $\mu C/m_2$). All of the surface charge induction techniques may be sufficient to drive the tactile feedback device.

According to the present disclosure, as described below, applying repulsion or attraction to the pressure-generation unit of the array of the pressure-generation units by inducing surface charges in the surface charge generation unit of the array of the pressure-generation units may be achieved on a pixel-by-pixel basis.

The array 20 of the surface charge generation units includes the plurality of surface charge generation units. The array 20 of the plurality of surface charge generation units includes the plurality of pixels. Each pixel corresponds to a respective pressure-generation unit. For example, in the case of a tactile feedback device that includes 16 pixels, the device will include 16 surface charge generation units and 16 pressure-generation units. According to the present disclosure, surface charge is induced at each pixel depending on the input information to each surface charge generation unit, and, thus, the induced charge reacts with positively or negatively charged charge formed below a pressure-transfer protrusion of the pressure-generation unit and thus generates repulsive force or attractive force. As a result, the pressure-transfer protrusion may be displaced vertically. This allows different tactile information corresponding to different pressures to be delivered to the skin.

Figure 2:
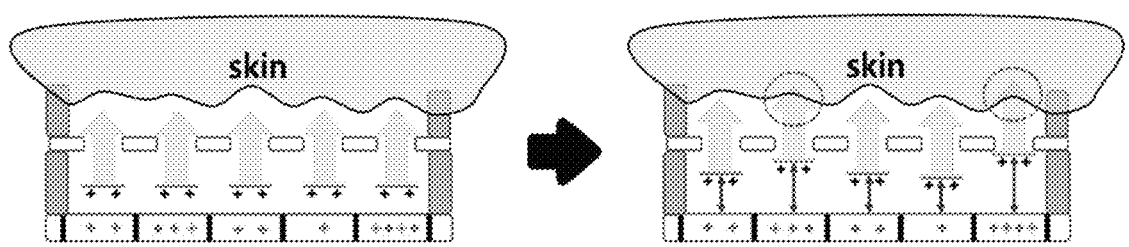
FIG. 2 shows a conceptual diagram of transfer of tactile information via actual operation of the tactile feedback device according to one embodiment of the present disclosure.

FIG. 2 shows a conceptual diagram of the transfer of tactile information according to the actual operation of the tactile feedback device according to one embodiment of the present disclosure. As shown in FIG. 2, depending on the input information, surface charge is induced at each pixel, and, thus, the pressure-transfer protrusion of the pressure-generation unit corresponding to each pixel is vertically displaced based on the induced surface charge polarity and the induced charge amount. Thus, this vertical level displacement of the protrusion is transmitted to the skin as tactile information. In FIG. 2, a second charge-trapping layer of the pressure-generation unit is positively charged. Thus, when, based on the input information, a positive charge is induced in a first charge trapping layer of the surface charge generation unit, a repulsive force is generated therebetween.

Figure 3:
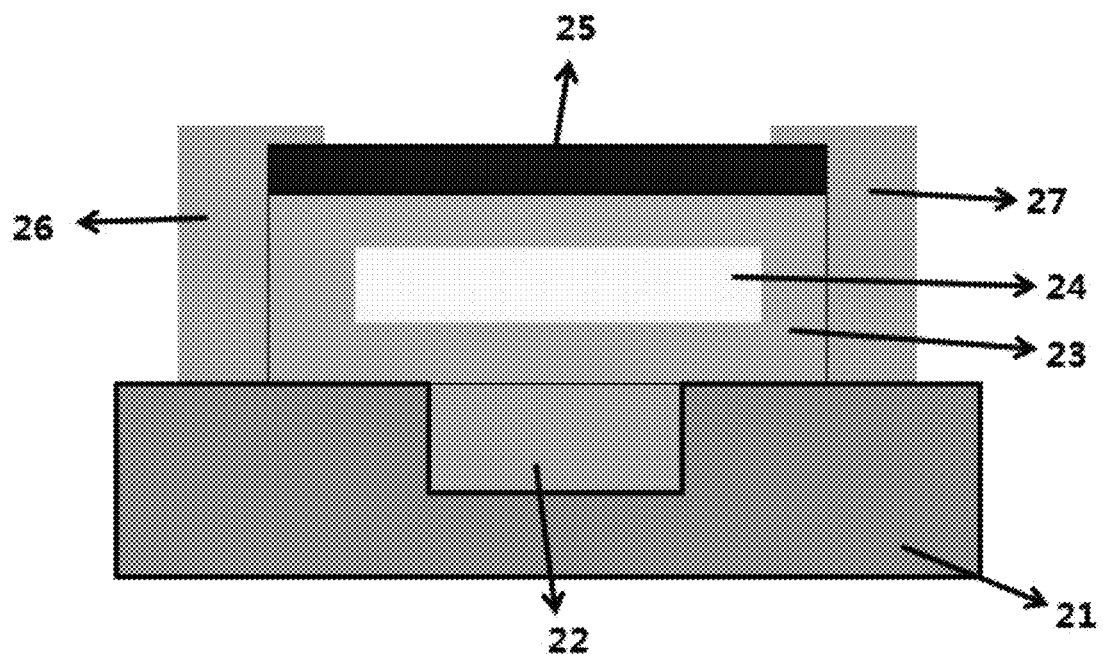
FIG. 3 shows the structure for each pixel of the surface charge generation unit according to one embodiment of the present disclosure.

The structure of each pixel of the array 20 of the surface charge generation units is shown in FIG. 3. As shown in FIG. 3, each pixel of the surface charge generation unit has a substrate 21; a gate electrode 22; an oxide layer 23; a first charge trapping layer 24; a channel layer 25; a source electrode 26; and a drain electrode 27.

The structure of the surface charge generation unit has an inverted structure of a commercialized floating gate memory. The principle of charge formation in the structure of the surface charge generation unit is the same as a conventional floating gate memory. However, since the electric field generated from the charge generated by the surface charge generation unit must be transferred to the pressure-transfer protrusion rather than the channel, a very thin channel layer with a low intrinsic charge carrier concentration is used to minimize the electric field shielding via the channel layer. Hereinafter, the applicants will explain each component in detail.

The material of the substrate 21 is not particularly limited. Any material may be used for the substrate. The substrate material may include flexible materials.

The gate electrode 22 is disposed on the substrate. The gate electrode 22 may be placed in a groove formed in the substrate, as in FIG. 3. However, this configuration is merely an example, and the present invention is not limited thereto, and may be configured in various forms. The gate electrode material may be any gate electrode material conventionally used. There are no particular restrictions on the material thereof.

The oxide layer 23 covers the gate electrode 22 to insulate the gate electrode. The oxide layer 23 acts as a gate oxide and includes the first charge trapping layer 24 formed therein. This oxide layer also acts as a tunneling oxide for tunneling of carriers from the first charge trapping layer toward the channel layer. The tunneling oxide layer is disposed between the channel layer 25 and the first charge trapping layer 24. The gate oxide layer is disposed between the gate electrode 22 and the first charge trapping layer 24. The material for this oxide layer may be used as commonly used, and there is no particular limitation thereto.

The first charge trapping layer 24 is disposed within the oxide layer 23, as shown in FIG. 3. In the first charge trapping layer 24, the polarity and amount of charges induced in the surface charge generation unit are determined based on the input information. The first charge trapping layer 24 should be configured to easily trap charge and easily lose charge, since the charge polarity and amount must be easily changed in the first charge trapping layer 24 depending on input information. Therefore, for the first charge trapping layer 24, it is preferable to use a material capable of receiving a high-density charge and controlling surface charge. Also, it is desirable for the first charge trapping layer 24 to have physically flexible characteristics. It is preferable that the first charge trapping layer 24 is capable of being driven with low power. In summary, it is preferable that a material having a high-density charge storage capability and a surface charge control function may be used as the material for the first charge trapping layer 24. Examples of such materials include at least one of CYTOP, TEFLON AF, and Parylene.

The channel layer 25 is disposed on the oxide layer 23. The channel layer has a very thin thickness at the atomic layer level to minimize the electromagnetic shielding effect. The channel layer is preferably made of a material having low intrinsic carrier concentration and mechanically flexible characteristics. In summary, it is preferable that a semiconductor material having a thin thickness and a low carrier concentration and thus minimizing electric field shielding is used as the channel layer material. It is preferable that a two-dimensional material is used as a material for the channel layer 25. It is preferable that such a two-dimensional material has a low carrier concentration and is a material that minimizes electric field shielding. Examples of the material having the low carrier concentration and minimizing the electric field shielding may include at least one of $MoS_2$, $WSe_2$, $MoTe_2$ and $WS_2$.

A source electrode 26 and a drain electrode 27 are disposed on both ends of the channel layer 25, respectively. There are no particular restrictions on the construction and materials for such source and drain electrodes.

As shown in FIG. 1, the array 10 of the pressure-generation units is arranged on the array 20 of the surface charge generation units and is spaced apart from the array of surface charge generation units. The array 10 of the pressure-generation units includes the plurality of pressure-generation units.

Figure 4:
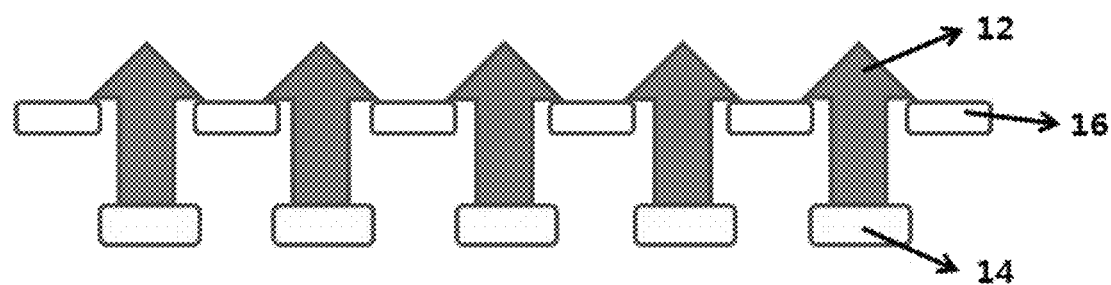
FIG. 4 shows a cross-sectional view of the pressure-generation unit according to one embodiment of the present disclosure.

FIG. 4 shows a cross-sectional view of the pressure-generation unit according to one embodiment of the present disclosure. As shown in FIG. 4, the pressure-generation unit includes a second charge trapping layer 14 and a pressure-transfer protrusion 12. On the other hand, as described above, the array 10 of the pressure-generation unit includes a plurality of pixels. Each pixel corresponds to a respective pressure-generation unit. Therefore, the surface charge generation unit and the pressure-generation unit is comprised for each pixel. Therefore, the pressure-transfer protrusion 12 and the second charge trapping layer 14 of the pressure-generation unit are arranged separately from each other as shown in FIG. 4. When the pressure-transfer protrusion 12 and the second charge trapping layer 14 of the pressure-generation unit are separately arranged as shown in FIG. 4, each pressure-transfer protrusion 12 is supported by a pressure-transfer protrusion support 16. The pressure-transfer protrusion support 16 is preferably made of a flexible material such as the substrate. However, the present invention is not limited thereto.

The pressure-transfer protrusion support 16 is configured such that the plurality of pressure-transfer protrusions 12 pass through the pressure-transfer protrusion support 16 individually on a pixel-by-pixel basis and are movable up and down. An upper portion of the pressure-transfer protrusion is exposed to the outside of the support 16 and is heled by the support 16, while a lower portion of the pressure-transfer protrusion is disposed below the support 16 and is not exposed to the outside thereof. The second charge trapping layer 14 disposed beneath the lower portion of the pressure-transfer protrusion 12 is configured to allow the pressure-transfer protrusions 12 to move up through the support 16, based on the electrostatic force (coulomb force), via the electrical interaction between the first and second charge trapping layers 14 and 24.

The pressure-transfer protrusion 12 act as a material that comes in direct contact with the skin. Therefore, as the material thereof, a material having excellent physical stability, light weight, stronger than skin, and having high durability must be considered. Therefore, for the pressure-transfer protrusion, it is preferable to use a lightweight material having excellent human skin-compatibility. Examples of the lightweight material excellent in human skin-compatibility may include at least one of P(VDF-TrFE), PFA, TEFLON, KAPTON, and PDMS.

The second charge trapping layer 14 should take into account the high density charge cohesion and the stability of the induced charge maintained for long periods of time. The second charge trapping layer 14 is preferably made of a material capable of receiving the high-density charge and capable of maintaining the received charge semi-permanently. An example of such materials capable of accommodating the high-density charge and capable of maintaining the accommodated charge semi-permanently includes at least one of CYTOP, TEFLON AF, and Parylene. Specifically, as the second charge trapping layer, it is preferable to use an electret.

FIG. 5 shows the operation of the surface charge generation unit according to one embodiment of the present disclosure in order. As shown in FIG. 5, first, the charge is induced in the first charge trapping layer by applying a voltage to the gate electrode. Thus, the Coulomb force is applied to the second charge trapping layer disposed under the pressure-transfer protrusion to generate the vertical displacement of the pressure-transfer protrusion. After that, by applying a voltage of a different polarity to the gate voltage, the trapped charge in the first charge trapping layer disappear, whereby the application of the Coulomb force may be terminated.

The present disclosure is to provide a construction of imitation reality using a tactile feedback device which is added to a conventional virtual reality device or augmented reality device. To this end, the present disclosure is to provide a tip-array type tactile feedback device using electrostatic force to construct an imitation reality that provides a multidimensional sense in which tactile feedback may be added to the virtual reality, which was previously limited to the visual information. For this purpose, optimization via the material and structural configuration of the pressure-generation unit, and the surface charge generation unit, which are the components of the tactile feedback device according to the present disclosure should be envisioned.

The above description is not to be taken in a limiting sense, but is made merely for the purpose of describing the general principles of exemplary embodiments, and many additional embodiments of this disclosure are possible. It is understood that no limitation of the scope of the disclosure is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar

What is claimed is:

1. A tactile feedback device comprising:
   an array of surface charge generation units, each unit comprises a first charge trapping layer disposed within an oxide layer; and
   an array of pressure-generation units, each unit comprises a second charge trapping layer disposed below a pressure-transfer protrusion,
   wherein the array of the pressure-generation units is spaced apart from the array of the surface charge generation units, wherein the array of the pressure-generation units is movable relative to the array of the surface charge generation units,
   wherein a force, as an attractive or repulsive force, is generated between a surface charge generation unit of the array of surface charge generation units and a corresponding pressure-generation unit of the array of the pressure-generation units, based on a polarity of surface charges induced in the surface charge generation unit,
   wherein when the force is the attractive force, the attractive force allows a spacing between the surface charge generation unit and the pressure-generation unit to be decreased, and when the force is the repulsive force, the repulsive force allows the spacing between the corresponding surface charge generation unit and the pressure-generation unit to be increased, and
   wherein the second charge trapping layer is configured to allow the pressure transfer protrusion to move through the spacing based on the force through an electrical interaction between the first and second charge trapping layers.

2. The device of claim 1, wherein a combination of the surface charge generation unit and the corresponding pressure-generation unit defines a corresponding pixel of the device.

3. A tactile feedback device comprising:
   an array of surface charge generation units; and
   an array of pressure-generation units spaced apart from the array of the surface charge generation units and movable relative to the array of the surface charge generation units,
   wherein an attractive or repulsive force is generated between a surface charge generation unit of the array of surface charge generation units and a corresponding pressure-generation unit of the array of the pressure-generation units, based on a polarity of surface charges induced in the surface charge generation unit,
   wherein the attractive force allows a spacing between the surface charge generation unit and the corresponding pressure-generation unit to decrease, while the repulsive force allows the spacing to increase,
   wherein a combination of the surface charge generation unit and the corresponding pressure-generation unit defines a pixel, and
   wherein the surface charge generation unit in each pixel includes:
      a substrate;
      a gate electrode disposed on a portion of the substrate;
      an oxide layer covering the gate electrode to insulate the gate electrode;
      a first charge trapping layer disposed within the oxide layer;
      a channel layer disposed on the oxide layer; and
      a source electrode and a drain electrode respectively disposed at both longitudinal ends of the channel layer.

4. The device of claim 3, wherein the oxide layer is defined into a tunneling oxide layer and a gate oxide layer.

5. The device of claim 4, wherein the tunneling oxide layer is disposed between the channel layer and the first charge trapping layer, and the gate oxide layer is disposed between the gate electrode and the first charge trapping layer.

6. The device of claim 3, wherein the channel layer is made of a two-dimensional material.

7. The device of claim 6, wherein the two-dimensional material includes a material having a low carrier concentration to minimize electric field shielding.

8. The device of claim 7, wherein the material having a low carrier concentration to minimize electric field shielding includes at least one of $MoS_2$, $WSe_2$, $MoTe_2$, and $WS_2$.

9. The device of claim 3, wherein the pressure-generation unit comprises:
   a second charge trapping layer, and
   a pressure-transfer protrusion disposed on the second charge trapping layer.

10. The device of claim 9, wherein the second charge trapping layer include an electret.

11. The device of claim 9, wherein the second charge trapping layer is made of a material capable of receiving high-density charges and capable of semi-permanently retaining the received charges therein.

12. The device of claim 3, wherein the first charge trapping layer is made of a material capable of receiving high-density charges and capable of controlling surface charges.

13. The device of claim 9, wherein the pressure-transfer protrusion includes a lightweight material having excellent compatibility with human skin.

14. The device of claim 13, wherein the lightweight material having excellent compatibility with human skin includes at least PDMS.

15. The device of claim 9, wherein the pressure-transfer protrusion is supported by a pressure-transfer protrusion support,
   wherein the pressure-transfer protrusion movably passes through the support, and
   wherein an upper portion of the pressure-transfer protrusion is held by the support, and a lower portion of the pressure-transfer protrusion is disposed under the support and is coupled to the second charge trapping layer.

* * * * *